United States Patent [19]

Murphree et al.

[11] Patent Number: 4,939,699
[45] Date of Patent: Jul. 3, 1990

[54] SONAR SYSTEM

[75] Inventors: Francis J. Murphree, Sunnyside; Henry L. Warner; Edward G. McLeroy, both of Panama City, all of Fla.

[73] Assignee: The United States of America as represented by the Secretary of the Navy, Washington, D.C.

[21] Appl. No.: 600,701

[22] Filed: Dec. 8, 1966

[51] Int. Cl.$^5$ ............................................. G01S 15/00
[52] U.S. Cl. ...................................... 367/88; 367/101
[58] Field of Search .......................... 340/3; 343/17.2; 367/88, 101; 342/25

[56] References Cited

U.S. PATENT DOCUMENTS 3,064,234  11/1962  Barrett ................................. 367/101
3,324,469  6/1967  Szerlip ................................ 342/131

Primary Examiner—Thomas H. Tarcza
Assistant Examiner—Daniel T. Pihulic
Attorney, Agent, or Firm—Sol Sheinbein; John Becker; Harvey David

[57] ABSTRACT

A sonar system having a sonar transmitter which is programmed to broadcast two sets of several increasing frequency signals, with the frequency gap between each set thereof sufficient to cause them to distinguish between deep and shallow water targets, respectively. A heterodyne receiver receives target echoes of said sets of several frequency signals and converts them to two sets of identical frequency signals which are then readout as a single continuous target display signal.

9 Claims, 2 Drawing Sheets

INVENTORS
FRANCIS J. MURPHREE
HENRY L. WARNER
EDWARD G. McLEROY

SONAR SYSTEM

The invention described herein may be manufactured and used by or for the Government of the U.S. of America for governmental purposes without the payment of any royalties thereon or therefor.

The present invention relates generally to echo-search-ranging systems, and, in particular, it is an improved sonar system for detecting and measuring the range to mine-size objects laying on the sea floor or buried either in the sand or mud thereof. In even greater particularity, it is a buried submarine mine hunting and identifying sonar system having an increased search rate and, hence, an increased information rate, which, in turn, provides either greater detection probability or increased area coverage.

In the past, echo-search-ranging sonar systems have been employed to detect and identify mine-like objects laying on or buried in the sea floor. Although satisfactory for many practical purposes, to date, they leave a great deal to be desired, particularly from the search rate and fidelity standpoints.

It is, therefore, an object of this invention to provide an improved method and means for detecting and identifying sea mines and mine-size objects laying on or buired in the ocean floor.

Another object of this invention is to provide an improved echo-search-ranging system.

Still another object of this invention is to provide an improved sonar system.

Another object of this invention is to provide an improved method and means of detecting, identifying, and measuring the depth of mine-size objects that are buried in either a sand or mud ocean bottom.

A further object of this invention is to provide a sonar system which has improved echo-to-reverberation ratio characteristics wihtout substantially reducing beamwidth.

A further object of this invention is to provide an echo-search-ranging system in general and a sonar system in particular that have increased area coverage rates.

Other objects and many of the attendant advantages will be readily appreciated as the subject invention becomes better understood by reference to the following detailed description, when considered in conjunction with the accompanying drawings wherein.

Figure 1:
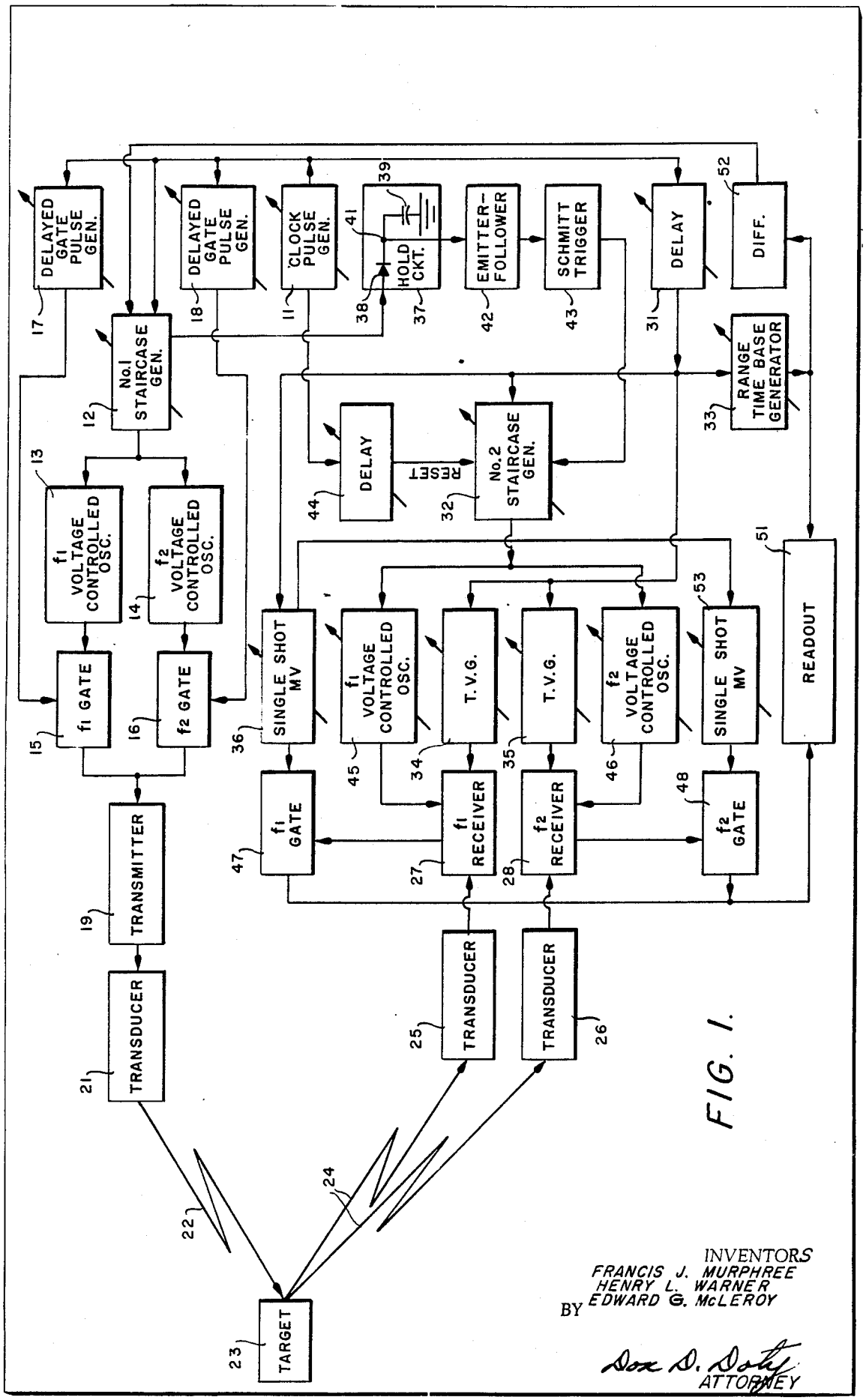
FIG. 1 is a block diagram of a preferred embodiment of the subject invention.

Referring now to the predetermined embodiment of the subject invention depicted in FIG. 1, there is shown a clock pulse generator 11 which is variable in such manner as to produce master pulses having a predetermined frequency. Clock pulse generator 11, of course, consitutes the major timing unit upon which all of the subsequently disclosed timing operations are either triggered or effectively actuated or correlated.

The output of clock pulse generator 11 is coupled to one of the inputs of a number 1 staircase generator 12, the output of which is simultaneously applied to the inputs of an $f_1$ voltage controlled oscillator 13 and a $f_2$ voltage controlled oscillator 14. The outputs of voltage controlled oscillators 13 and 14 are respectively applied to the inputs of $f_1$ gate 15 and $f_2$ gate 16 for being timely gated thereby.

The output of the aforesaid pulse generator 11 is also applied simultaneously to the inputs of a pair of variable delayed gate pulse generators 17 and 18, the outputs of which are coupled to the gating inputs of the aforementioned $f_1$ and $f_2$ gates 15 and 16, respectively. The aforesaid delayed gate pulse generators 17 and 18 may take the form of any conventional devices which produce appropriate gating signals having predetermined periods, wherein said signals are generated at such times as are compatible with the environmental medium in which the subject invention is operating. Hence, it may readily be seen, that the delay of the pulses generated thereby may be varied from zero to any predetermined delay, as desired.

The outputs of the aforementioned gates 15 and 16 are connected to the input of a transmitter 19 which, in turn, converts the intelligence signals thereof to a more useful level and character before being applied to the input of a transmitting transucer 21. In this particular instance, since the preferred embodiment of the invention disclosed herein is a sonar system, transducer 21 is a electroacoustical transducer which is so designed as to broadcast acoustical energy throughout a subaqueous medium in response to a comparable electrical signal applied to the input thereof. Accordingly, transducer 21 broadcasts an acoustical search signal 22 throughout sea water or the like which ultimately impacts upon a target 23. As a result thereof, echo signals 24 are reflected from said target 23 and, likewise, travel through the sea water environment back to a pair of receiving transducers 25 and 26, which are preferably contiguously disposed or disposed in some other desirable spatial disposition with respect to the aforementioned receiving transducer 21. Of course, receiving transuducers 25 and 26 are, likewise, electroacoustical transducers, but in this particular instacne, they should be so designed as to respectively produce electrical signals at the outputs thereof which are proportional to the acoustical signals received thereby.

The outputs of receiving transducers 25 and 26 are respectively applied to the inputs of an $f_1$ heterodyne tuned receiver 27 and an $f_2$ heterodyne tuned receiver 28 for the processing thereof in such manner as to provide them with conventional signal mixing and, as appropriate, filtering, amplification to more useful levels, and any other desired characteristics, as will be discussed in greater detail subsequently.

In order to correlate the processing of the transmitted and received signals, a programming procedure is employed. Accordingly, the outputs of the aforesaid clock pulse generator 11 is connected to the input of a delay 31, and the delay output thereof is connected to the inputs of a variable number 2 staircase generator 32, a variable range time base generator 33, a pair of variable time-varied-gain devices 34 and 35, and a single shot multivibrator 36.

The other of the outputs of staircase generator 12 is applied to the input of a hold circuit 37 andd, in actuality, is connected to the anode of a diode 38 contained therein. The cathode of diode 38 is connected through a capacitor 39 to ground. As may readily be seen, the output of hold circuit 37 is taken from the common junction 41 of diode 38 and capacitor 39, and it is connected to the input of an emitter follower 42. The output of emitter follower 42 is coupled to the input of a Schmitt trigger 43, the output of which is connected to another of the inputs of the aforementioned staircase generator 32.

Clock pulse generator 11 has its output also applied to the input of a delay 44, with the output thereof connected to the reset input of said staircase generator 32.

The output of staircase generator 32 is connected to the inputs of a variable $f_1$ voltage controlled oscillator 45 and a variable $f_2$ voltage controlled oscillator 46, the outputs of which are respectively connected to the heterodyning inputs of the aforementioned receivers 27 and 28. The intelligence signal output of receivers 27 and 28 are respectively applied to the gated inputs of an $f_1$ gate 47 and an $f_2$ gate 48, with the outputs thereof connected to the intelligence signal input of a readout 51.

One of the outputs of the aforementioned single shot multivibrator 36 is coupled to the gating input of $f_1$ gate 47 for the timely opeing and closing thereof, and the other output of single shot multivibrator 36 is connected to the input of another single shot multivibrator 53 for sequential actuation thereof at the end of the change of state of single shot multivibrator 36. The output of sing shot multivibrator 53 is coupled to the gating input of the aforesaid $f_2$ gate 48 for the timely opening and closing thereof.

The aforementioned range time base generator 33 is preferably a variable sawtooth generator, and the output thereof is connected to the sweep circuit input of the aforementioned readout 51. The output of range time base generator 33 is also connected to the input of a differentiator 52, which is preferably so designed as to effect differentiation of the sawtooth signal supplied thereto at the trailing edge thereof. The resulting pulse constitutes the output of differntiator 52 and is connected to the reset input of the aforementioned staircase generator 12 for the timely resetting thereof, as will be explained more fully in the discussion of the operation of the entire invention presented below.

The operation of the invention will now be discussed briefly in conjunction with all of the figures of the drawing.

Figure 2:
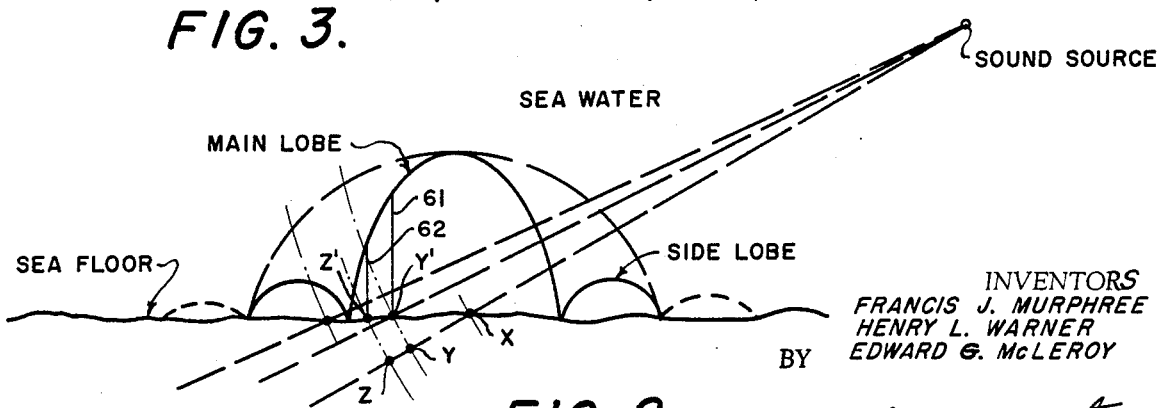
FIG. 2 is a quasi-pictorial view, which illustrates the theory of operation of the subject inventive concept.

Referring first to the illustration of FIG. 2, it may be seen that, if acoustical energy is broadcast toward the sea floor at an angle therewith by a sound source located above said sea floor, it will penetrate it, as well as be reflected by it. Thus, an object located at point Y is the same distance from the sound source as point Y' will arrive back at the sound source at practically the same time. If it is assumed, for instance, that the amplitude of the sea floor reverberation is proportional to the interface insonification thereof, then the amplitude of the reverberation will be proportional to the length of the main lobe line 61 passing through Y'. Correspondingly, an echo from an object located at point Z will have interface reverberation that is proportional to line 62 through Z'. Since line 62 is shorter than line 61, the interferring reverberation is less at Z' than at Y'; the actural reverberation ratio with respect to object Z may be greater than with respect to object Y, depending on the length of path traveled and the additional sound attenuation which occurs as a result of the echo traveling the longer path. Ultimately, the increase in attenuation will offset the decrease in interface reverberation.

It has been experimentally demonstrated that the acoustical energy attenuation in sand and mud bottoms increases with frequency. Accordingly, the maximum depth at which targets can be detected by using relatively high frequencies is substantially limited. But a target detection capability at greater ocean depths is desirable. An improved method of accomplishign this (while maintaining at the same time the best possible performance for shallow targets within the restraints posed by transducer size) is to use a lower frequency search signal for detection of targets at some lesser depth. The lower frequency beam pattern would then be broader than that for the higher frequency, resulting in a broader bottom insonification pattern somewhat like that defined by the dashed lines of FIG. 2. But since the attenuation within the bottom is approximately proportional to both the amount of bottom material penetrated and frequency, an echo originating at some lower depth will be atteunuated at the lower frequency an amount equal to that occurring at some lesser depth at a higher frequency. Therefore, the resulting echo-to-surface reverberations are about the same for both cases. In other words, it sould be readily seen that the echo-to-reverberation ratios will be improved by using lower frequency search signals as the depth of target search is increased, since attenuation due to sea bottom materials is less at lower frequencies than it is at higher frequencies.

While the method and means constituting this invention relates primarily to detection of buried objects, it should be understood that it is not limited thereto, since, it should be applicable whenever an increase in information rate from a given range segment is desired. This is true, due to the fact that useful information is ordinarily received only during that period of time required for the ping-receive sequence to occur. Thus, assuming the sound source to be 32 feet from the most distant target, the total time required to complete one ping-receive cycle is approximately 32 feet/2500 feet per second or 12.8 milliseconds. If it is assumed, for example, that the range interval of interest extends from 28 to 32 feet, then only during the last 1.6 milliseconds is useful information received. But, if extra pulses of different frequencies are transmitted during the unused time, the information rate can be increased as much as other system limitations will allow. Even though water volume reverberation is considerably less than that received from the sea bottom, fish or other sea animals that may swim between the transmitting transducer and the sea bottom return echoes during the receiving interval, and echoes therefrom could cause confusion if the same transmitted frequency is employed. This is known to be true because it has occurred during the operation of some of the conventional fathometers in use today.

The device of FIG. 1 puts the aforegoing principles into actual operation for the purpose of rapidly and accurately locating and identifying submarine mines that are lying on the sea floor or submerged therein. As may readily be seen, the entire device of this invention is timely regulated by clock pulse generator 11 which produces a continuous signal similar to that ideally represented by the waveform of FIG. 3(a). This master timing signal is supplied as one of the inputs to staircase generator 12 in such manner as to initiate the timely increased voltage steps shown in the waveform of FIG. 3(b). In this particular instance, a three-step staircase generator is employed because it has been found to be effective for most practical purposes. However, it should be understood that it may, if desired, be so designed as to produce any other suitable number of sequentially stepped-up voltages. Furthermore, as will be discussed in greater detail below, staircase generator 12 should be so designed that it is capable of being reset by a predetermined signal supplied thereto during the third voltage step generation thereof.

The timely increasing step voltages from staircase generator 12 are applied to the inputs of voltage controlled oscillators 13 and 14, so as to cause them to each produce a predetermined trio of successively increasing frequency signals similar to those depicted in FIG. 3(c) as having frequencies of 120, 140, and 160 kilocycles per second and FIG. 3(d) as having frequencies of 20, 40, and 60 kilcycles per second, respectively. These are the signals, of course, that are respectively gated by $f_1$ gate 15 and $f_2$ gate 16 as a result of gating signals being supplied thereto by delayed pulse generators 17 and 18. FIGS. 3(e) and 3(f) illustrate typical gating signals which are used to timely open gates 15 and 16. Inasmuch as delayed gate pulse generators 17 and 18 are disclosed as both being variable, it should be understood that the signal waveforms of FIGS. 3(e) and 3(f) may be varied with respect to the positive portions thereof as well as being delayed in toto for any appropriate period of time.

When gates 15 and 16 are opened as a result of the gating signals from delayed gate pulse generators 17 and 18 being respectively applied thereto, a pair of signals represented by the waveforms of FIGS. 3(g) and 3(h) are produced at the outputs thereof and supplied to transmitter 19 for amplification and wave refinement before being supplied to transmitting transducer 21 for broadcast thereby.

In this particualr instance, the delayed portion of delayed gate pulse generator 17 is incorporated in the subject invention so as to insure that gate 15 is not opened until staircase generator 12 has reched a stable condition. The delay 4 portion of delayed gate pulse generator 18 is incorporated in the subject invention to insure that $f_2$ gate 16 is opened at the same time that $f_1$ gate 15 is closed.

Figure 3:
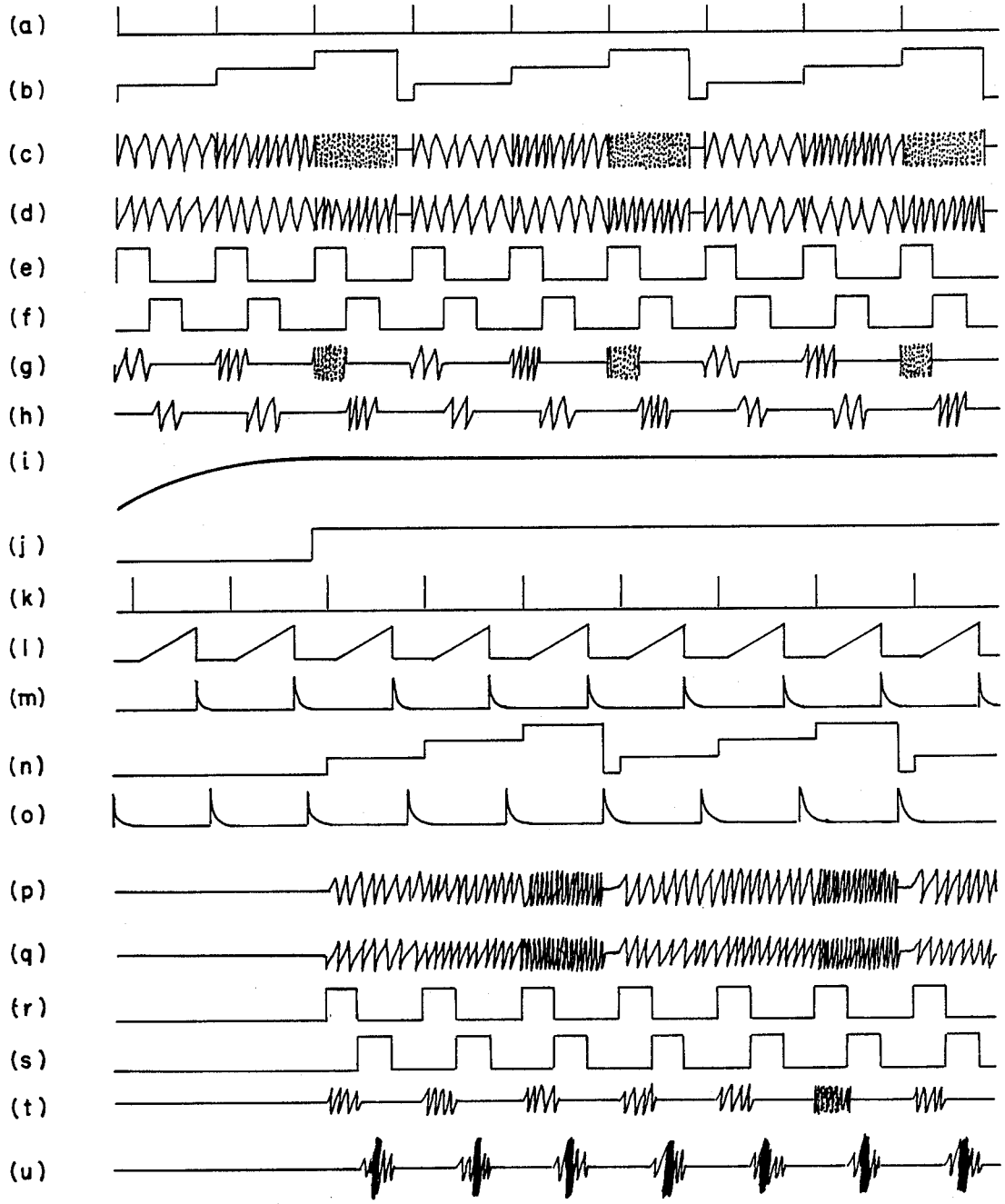
FIG. 3 is an idealized graphical representation of the signal waveforms which emanate from the various components of the system of FIG. 1.

It can be readily be discerned by inspection of FIG. 3 that the signal frequencies illustrated therein cannot possibly be shown in their exact form, inasmuch as the frequencies thereof are entirely too high for precise illustration. Accordingly, it should be understood that the frequencies of FIGS. 3(c and 3(d) are respectively increased three times within a relatively high frequency range (say, 120, 140, and 160 kilocycles per second) and within a low frequency range (say, 20, 40, and 60 kilocycles per second). As a result of this, of course, the waveforms of FIG. 3(g) and FIG. 3(h) likewise include sets of three increasing frequencies which are identical to the sets of three increasing frequencies produced at the outputs of voltage controlled oscillators 13 and 14, respectively.

Because gates 15 and 16 are timely and alternately opened, transducer 21 timely broadcasts the composite of the waveforms shown ideally in FIGS. 3(g) and 3(h) throughout the subaqueous medium within which sea mines or other target objects are being searched. qo It has been found that improved operation of the subject invention will be effected if the sonic energy broadcast by transducer 21 is directed toward the sea floor at some predetermined acute angle, the ansularity of which is preferably determined primarily by the type of bottom. A re-inspection of FIg. 2 and the opertional theory thereof discussed above will undoubtedly disclose the type of anuglar echo-search-ranging signal which is most efficient for the purposes herein stated.

Once a mine laying on the sea floor or buried therein is acquired by the search signal, the sonic energy thereof is reflected thereby back through the sea water as echo signals 24 to receiving transuducers 25 and 26. Obviously, if said mine target 23 is lying upon the sea floor the reflections therefrom are purer than they would be if it were buried within the sea floor. Accordingly, those sets of search signals containing the higher frequencies would best detect and identify the target, because it would not be necessary for them to penetrate the sand or mud of the sea floor. On the other hand, if target 23 is buried within the sea floor, those frequency sets containing the lower frequencies will best detect and identify the acquired target, because they inherently contain those physical characteristics which facilitate their penetration and travel through the sea floor sand and/or mud materials thereof. Thus, if target 23 happens to be laying on top of the sea floor, the relatively high frequency signals of FIG. 3(g) will be the stronger when they are received by the receiving transducers. But, in event the target is buried within the sea floor, the relatively low frequency signals of FIG. 3(h) will be stronger when they are received by the receiving transducers.

Regardless of which of the aforementioned sets of the received signals is stronger, they are received by receiving transducers 25 and 26 which respectively convert them into electrical signals proportional thereto, which are then supplied to heterodyne receivers 27 and 28 for further processing, as will be discussed subsequently.

In order to correlate the receiving portions of this invention with the transmitting portions thereof, as previously suggested, a programmed system is used. This system likewise makes use of th aforementioned clock pulse generator 11 as its master timing device. Since this master timing device times the operation of staircase generator 12, an output signal is taken therefrom at the instant the first step voltage commences to be generated. This signal is supplied to hold circuit 37, wherein it is allowed to increase to a predetermined level and there remain until such time as the subject sonar system is turned off. Of course, the polarity of the signal held thereby is determined by diode 38 which controls the polarity of the charge which takes place in capacitor 39 relative to ground. For circuit isolation purposes, this held voltage signal is fed through emitter-follower 42 before being applied to Schmitt trigger 43 to turn it on. As may be seen from the waveform of FIG. 3(i), the voltage output from emitter-follower 42 increases to the maximum at the instant the generation of the third step voltage is effected by staircase generator 12, and once this occurs, the output from Schmitt trigger 43, represented by the waveform of FIG. 3(j), is generated and supplied to number 2 staircase generator 32 to energize it.

The output of clock pulse generator 11 is also supplied to delay 31, which delays the occurrence thereof in such manner as to produce the waveform represented by FIG. 3(k). This delayed pulse signal is applied to several components of the subject invention at the same time. It is supplied to range time base generator 33 for effecting the generation of the sawtooth waveform of FIG. 3(l), it is supplied to one of the inputs of staircase generator 32 to initiate the generation of the three stair-step voltages illustrated in the waveform of FIG. 3(n), it is supplied to the control input of single shot multivibrator 36 to effect the changing of state thereof, and it is supplied to the inputs of time-varied-gain elements 34 and 35 for the timely actuation thereof.

The sawtooth signal waveform output from range time base generator 33 is differentiated at the trailing edges of each of the sawtooths thereof, and so doing causes the waveform of 3(m) to be effected. The resulting pulse signal is then supplied to the reset input of the aforementioned staircase generator 12 for the purpose of resetting it at the time every third pulse thereof occurs. Hence, as inspection of FIG. 3(b) will disclose, there is a predetermined reset period disposed between the successive sets of increasing voltage steps.

Again, the output of clock pulse generator 11 is delayed in such manner by delay 44 that staircase generator 32, likewise, is reset at the occurrence of every third pulse thereof, illustrated in FIG. 3(o), thereby causing a reset period to exist between the successive sets of three stairstep voltages produced thereby.

As previously mentioned, the delayed pulses from delay 31 cause single shot multivibrator 36 to change state and there remain for whatever time it is manually set. In this particular instance, the output of single shot multivibrator is illustrated in FIG. 3(r) as having an unstable state for a period of time which is equal to half of the time period of the range time base sawtooth depicted in FIG. 3(l). When single shot multivibrator 36 reverts back to its initial stable state, it acutates single shot multivibrator 53 to its unstable state. The unstable state thereof, likewise, has a time period that is equal to half of that of the sawtooth portion of the waveform of FIG. 3(l). Hence, it may readily be seen, that the addition of the time periods of the waveforms of FIG. 3(r) and FIG. 3(s) are substantially equal to the sweep signal supplied to the horizontal input of readout 51.

The outputs of single shot multivibrators 36 and 53 alternately open gates 47 and 48, thereby allowing the signals from receivers 27 and 28 to pass therethrough and be supplied to the intelligence signal input of readout 51 for indication and/or display thereby.

Because the output signal from staircase generator 32 is supplied to voltage controlled oscillators 45 and 46, another pair of sets of three-frequency signals are respectively generated which are similar to those shown in FIG. 3(p) as having frequencies of 100, 120, and 140 kilocycles per second and FIG. 3(q) as having frequencies of 10, 30, and 50 kilocycles per second, and when they are heterodyned in tuned receivers 27 and 28 with the aforementioned signals received from transducers 25 and 26, they respectively provide at the outputs thereof a pair of 20 and 10 kilocycle per second intermediate frequency signals. Hence, the output signals from receivers 27 and 28, which are alternately passed through gates 47 and 48 to the intelligence input of readout 51 each contain the same frequency. Although, as previously suggested, graphical representation has its limitations, the waveforms of FIG. 3(t) and FIG. 3(u) are intended to represent the gated output of tuned receivers 27 and 28, respectively; and in this particular case, the waveform of FIG. 3(u) also has incorporated therein larger amplitude pulses, which indicate that a target has been acquired. Because the waveforms of FIG. 3(u) contains the pulses of the acquired target, and because it effectively originates within receiver 28 which has been heterodyned by the step frequency signals of voltage controlled oscillator 46, an opertor observing readout 51 may infer that the acquired target is one which is buried within the sea floor rather than laying on it.

As previously mentioned, the delayed trigger pulses from delay 31 are also applied to time-varied-gain elements 34 and 35 for the timely actuation thereof. This actuation is, of course effected at the same time gate 47 is opened and lasts until gate 48 is closed. Thus, the signals being processed within receivers 27 and 28 are respectively amplified in such manner that their amplitudes remain substantially the same as a result of the receiver gains being automatically increased in proportion to the range to the target. Although for many practical purposes this feature of the invention may not be absolutely necessary, it has been found to definitely be desirable, since it causes an improved fidelity readout of the received signals to occur.

It should be understood that while receivers 27 and 28 are showns as being effectively connected to readout 51, they could just as well have been connected to a conventional sampling device in the event that a number of pairs of receiving transducers has been used instead of just one pair thereof, and the outputs therefrom were desired to be displayed.

The foregoing description pertains to a preferred sonar embodiment of the subject invention. However, it should be understood that the principle thereof may be used and the structure embodying it may be so constructed as to make it a radar system embodiment operable within an atmospheric or spatial environment, inasmuch as so doing would merely involve design changes, the making of which would obviously be well within the purview of one skilled in the art having the benefit of the teachings herein presented.

Obviously, other embodiments and modifications of the subject invention will readily come to the mind of one skilled in the art having the benefit of the teachings presented in the foregoing description and the drawings. It is, therefore, to be understood that this invention is not to be limited thereto an that said modifications and embodiments are intended to be included within the scope of the appended claims.

What is claimed is:

1. A sonar system comprising in combination:
   a clock pulse generator;
   a staircase voltage genertor connected to the output of said clock pulse generator;
   a first voltage controlled oscillator connected to the output of said staircase voltage generator for producing a first predetermined trio of successively increasing frequency signals within a first predetermined frequency range;
   a second voltage controlled oscillator connected to the output of said staircase voltage generator for producing a second predetermined trio of successively increasing frequency signals within a second predetermined frequency range that is relatively lower in frequency than the aforesaid first predetermined frequency range;
   means connected to the outputs of said first and second voltage controlled oscillators for alternately broadcasting within a subaqueous medium each of the trio of successively increasing frequency signals of said first predetermined frequency range with each of the corresponding signals of the trio of successively increasing frequency signals of said second predetermined frequency range;
   means for receiving each of the aforesaid first and second trios of successively increasing frequency signals after they have been reflected from a target submerged within said subaqueous medium;

means connected to said receiving means for timely and respectively heterodyning third and fourth trios of successively increasing frequency signals with the aforesaid first and second trios of successively increasing frequency signals in such manner as to alternately produce a given constant intermediate frequency signal for each of said first and second frequency ranges; and means connected to said heterodyning means and the output of said receiving means for reading out said alternately produced given constant intermediate frequency signals as a single continuous signal.

2. The device of claim 1 wherein said means connected to said receiving means for timely and respectively heterodyning a third and fourth trio of successively increasing frequency si with the aforesaid first and second trios of successively increasing frequency signals in such manner as to alternately produce a given constant intermediate frequency signal for each of said first and second frequency ranges comprises:

a first variable delay means connected to the output of said clock pulse generator;

a second staircase voltage generator having a trigger input, an energizing input, and a reset input, with the trigger input thereof connected to the output of said first variable delay means;

a second variable delay means connected between the output of said clock pulse generator and the reset input of said first mentioned staircase voltage generator;

means connected between the output of the aforesaid first mentioned staricase voltage generator and the energization input of said second staircase voltage generator for the timely enabling thereof;

a third variable voltage controlled oscillator connected to the output of said second variable delay means for producing a third trio of timely and successively increasing frequency signals;

a fourth variable voltage control oscillator connected to the output of said second variable delay means for producing a fourth trio of timely and successively increasing frequency signals which are separated from the trio of timely and successively increasing frequency signals produced by the aforesaid third variable control oscillator by a predetermined frequency range;

a first receiver having a pair of inputs and an output, with one of the inputs thereof coupled to the output of the aforesaid third variable voltage controlled oscillator for response to said third trio of timely and successively increasing frequency signals;

a second receiver having a pair of inputs and an output, with one of the inputs thereof connected to an output of the aforesaid fourth variable voltage controlled oscillator for response to said fourth trio of timely and successively increasing frequency signals;

a pair of gates respectively connected to the outputs of said third and fourth receivers;

a first single shot multivibrator connected between the output of the aforesaid second variable delay means and the trigger input of one of the aforesaid gates;

a second single shot multivibrator connected between the output of said first single shot multivibrator and the input of the other of the aforesaid gates;

a readout means having an intelligence signal input and a time base input, with the intelligence input thereof connected to the outputs of said pair of gates;

a variable range time base generator connected between the output of said second variable delay means and the time base signal input of the aforesaid readout means; and a differentiator connected between the output of said range time base generator and the input of the aforesaid first mentioned staricase generator for the timely resetting thereof.

3. The invention of claim 2 further characterized by means connected between the output of said second variable delay means and the inputs of said first and second receivers for timely varying the respective gains thereof in such manner as to make the output signals thereof have substantially equal amplitudes for all target ranges when no target echoes are present.

4. The device of claim 1 wherein said means connected to the outputs of said first and second voltage controlled oscillators for alternately broadcasting within a subaqueous medium each of the trio of successively increasing frequency signals of said first predetermined frequency range with each of the corresponding signals of the trio of successively increasing frequency signals of said second predetermined frequency range comprises:

a first variable delayed gate pulse generator connected to the output of said clock pulse generator;

a second variable delayed gate pulse generator connected to the output of said clock pulse generator;

a first gate having a gated input, a gating input, and an output, with the gated input thereof connected to the output of the aforesaid first voltage cotnrolled oscillator for response to said first trio of predetermined successively increasing frequency signals, and with the gating input thereof connected to the output of the aforesaid first variable delayed pulse generator;

a second gate having a gated input, a gating input, and an output, with the gate input thereof connected to the output of the aforesaid second voltage controlled oscillator for response to said second trio of predetermined successively increasing frequency signals, and with the gating input thereof connected to the output of the aforesaid second variable delayed generator;

a transmitter connected to the outputs of said first and second gates; and a transmitting transducer connected to the output of the aforesaid transmitter.

5. The device of claim 1 wherein said means for receiving each of the aforesaid first and second trios of successively increasing frequency signals after they have been reflected from a target submerged within said subaqueous medium comprises a pair of receiving transducers.

6. A sonar system comprising in combination:

a clock pulse generator;

a first variable staircase generator connected to the output of said variable clock pulse generator;

a first variable voltage controlled oscillator connected to the output of said variable staircase voltage generator for producing a first predetermined trio of successively increasing frequency signals within a first predetermined frequency range;

a second variable voltage controlled oscillator connected to the output of said first variable staircase voltage generator for producing a second predetermined trio of successively increasing frequency signals within a second predetermined frequency range that is relatively lower in frequency than the aforesaid first predetermined frequency range;

a first variable delayed gate pulse generator connected to the output of said clock pulse generator;

a second variable delayed gate pulse generator connected to the output of said clock pulse generator;

a first gate having a gated input, a gating input, and an output, with the gated input thereof connected to the output of the aforesaid first variable voltage controlled oscillator, and with the gating input thereof coupled to the output of said first variable delayed gate pulse generator;

a second gate having a gated input, a gating input, and an output, with the gated input thereof, connected to the output of the aforesaid second variable controlled oscillator, and with the gating input thereof connected to the ouput of said second variable delayed gate pulse generator;

a transmitter connected to the outputs of said first and second gates;

an electroacoustical transmitting transducer connected to the output of said transmitter;

a first delay means connected to the output of said clock pulse generator;

a second staircase voltage generator having a trio of inputs and an ouput with one of the inputs thereof connected to the output fo said first delay means;

means connected between an output of the aforesaid first variable staircase voltage generator and another of the inputs of said second variable staircase voltage generator for the timely enabling thereof;

second delay means connected between the output of said clock pulse generator and the remaining input of said second variable staircase voltage generator for the timely resetting thereof;

a third voltage controlled oscillator connected to the output of said second variable staircase voltage generator;

a fourth variable voltage controlled oscillator connected to the output of said second variable staircase voltage generator;

a first super heterodyne receiver having a pair of inputs and an output, with one of the inputs thereof connected to the output of said third variable voltage controlled oscillator;

a second heterodyne receiver having a pair of inputs and an output, with one of the inputs thereof connected to the output of said fourth variable voltage controlled oscillator;

a pair of electroacoustical receiving transducers respectively connectd to the other inputs of the aforesaid first and second heterodyne receivers;

a first single shot multivibrator connected to the output of the aforesaid first variable delay means;

a second single shot multivibrator connected to the output of said first single shot multivibrator;

a third gate having a pair of inputs and an output, with one of the inputs connected to the output of said first single shot multivibrator, and with the other input thereof connectd to the output of the aforesaid first heterodyne receiver;

a fourth gate having a pair of inputs and an output, with one of the inputs thereof connectedd to the output of said second single shot multivibrator, and with the other input thereof connected to the output of the aforesaid second heterodyne receiver;

a variable time base generator means connected to the output of said first variable delay means;

a readout means having a pair of inputs, with one of the inputs thereof connected to the output of said variable range time base generator means, and with the other input thereof connected to the outputs of the aforesaid third and fourth gates; and a differentiator connected between the output of said variable range time base generator means and the reset input of the aforesaid first variable staircase voltage generator.

7. The device of claim 6 wherein said second variable staircase voltage generator enabling means comprises:

a hold circuit connected to an output of said first variable staircase voltage generator for building and holding a given voltage signal in response to a predetermined level of staircase voltage produced thereby;

an emitter-follower connected to the output of said hold circuit; and a Schmitt trigger connected to the output of said emitter-follower.

8. The device of claim 7 wherein said hold circuit comprises:

an input terminal;

a diode having an anode and a cathode, with the anode thereof coupled to the aforesaid input terminal;

a ground;

a capacitor connected between the cathode of said diode and said ground; and an output terminal coupled to the common junction of said diode and capacitor.

9. The invention according to claim 6 further characterized by a pair of time-varied-gain means respectively connected between the output of said first variable delay means and inputs of the aforesaid first and second heterodyned receivers.

* * * * *